(12) United States Patent
Miyamoto et al.

(10) Patent No.: US 12,343,915 B2
(45) Date of Patent: Jul. 1, 2025

(54) MOLD DEGASSING APPARATUS

(71) Applicant: Mazda Motor Corporation, Hiroshima (JP)

(72) Inventors: Shota Miyamoto, Aki-gun (JP); Yusaku Murao, Aki-gun (JP); Shohei Fujii, Aki-gun (JP); Shohei Hanaoka, Aki-gun (JP); Yasuhisa Matsuo, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 142 days.

(21) Appl. No.: 18/488,240

(22) Filed: Oct. 17, 2023

(65) Prior Publication Data

US 2024/0149511 A1    May 9, 2024

(30) Foreign Application Priority Data

Nov. 7, 2022  (JP) .................................. 2022-178179

(51) Int. Cl.
    *B29C 45/34*    (2006.01)
(52) U.S. Cl.
    CPC .................................. *B29C 45/34* (2013.01)

(58) Field of Classification Search
    CPC ........ B22C 9/067; B22D 17/145; B29C 45/34
    See application file for complete search history.

(56) References Cited

FOREIGN PATENT DOCUMENTS

JP    2019005792 A    1/2019

*Primary Examiner* — James Sanders
(74) *Attorney, Agent, or Firm* — Alleman Hall & Tuttle LLP

(57) ABSTRACT

A pressure receiving pin includes a fitting portion in a through hole of a fixed mold that communicates with a portion of an exhaust passage on an inlet side, a columnar distal end portion located coaxially with the fitting portion while closer to the exhaust passage that slides with respect to the through hole upon reception of molten metal, and an intermediate portion also located coaxially between the fitting portion and the distal end portion and that has a diameter smaller than a diameter of the distal end portion. An air supply device supplies air when a movable mold is opened such that the air passes through gaps formed between an outer peripheral surface of the intermediate portion and an inner peripheral surface of the through hole and between the distal end portion and the fixed mold, and flows out to the movable mold.

11 Claims, 6 Drawing Sheets

MOLD DEGASSING APPARATUS

TECHNICAL FIELD

The technique disclosed herein belongs to the technical field relating to a mold degas sing apparatus.

BACKGROUND ART

Conventionally, a mold degassing apparatus disclosed in JP2019-005792A has been known as a mold degassing apparatus used for discharging gas from the cavity of a mold for casting a cast product.

The mold degassing apparatus disclosed in JP2019-005792A has an exhaust passage that is formed on a mating surface portion between a fixed mold and a movable mold. The inlet of the exhaust passage communicates with the cavity of a mold, and the outlet of the exhaust passage is connected to a suction device that suctions gas in the cavity. A pressure receiving pin having a circular cross section is provided on the inlet side of the exhaust passage in the fixed mold. This pressure receiving pin is provided in such a way as to be slidable toward the exhaust passage and toward the side opposite to the exhaust passage, and is configured to slide toward the side opposite to the exhaust passage due to the flow pressure of molten metal that flows into the exhaust passage. A closing valve is provided on the outlet side of the exhaust passage in the fixed mold, the closing valve being configured to close the exhaust passage via an interlocking lever due to the sliding of the pressure receiving pin toward the side opposite to the exhaust passage. With such a configuration, it is possible to prevent molten metal that flows into the exhaust passage from being discharged from the outlet of the exhaust passage.

SUMMARY OF INVENTION

Problems to be Solved by the Invention

In the mold degassing apparatus described above, to allow the pressure receiving pin to smoothly slide without causing looseness, the pressure receiving pin is disposed with a predetermined clearance formed between the pressure receiving pin and the inner peripheral surface of a hole portion into which the pressure receiving pin fits. When a large number of cast products are continued to be repeatedly formed with the cavity, a foreign substance, such as molten metal or lubricating oil for lubricating the cavity, eventually enters and solidifies in the clearance portion, so that there is a concern that the pressure receiving pin becomes less able to slide. When the pressure receiving pin becomes less able to slide, it becomes impossible to close the exhaust passage with the closing valve, and therefore the continuous operation of the degassing apparatus is hindered.

In JP2019-005792A, by reducing the flow of molten metal by providing a depression at the portion of the pressure receiving pin on the exhaust passage side, entrance of the molten metal into the clearance portion is suppressed. However, even with such a configuration, it is difficult to completely suppress intrusion of molten metal into the clearance portion, so that there is a concern that a slight amount of molten metal that intrudes into the clearance portion is accumulated in the course of repeating castings, thus causing the pressure receiving pin to be less able to slide. In view of the above, there is room for improvement from the viewpoint of suppressing deterioration of the slidability of the pressure receiving pin.

The technique disclosed herein has been made in view of such a point, and it is an object of the technique to suppress, as much as possible, a situation in which the slidability of the pressure receiving pin is deteriorated by a foreign substance that enters a gap formed between the outer peripheral surface of the pressure receiving pin and the inner peripheral surface of the hole portion into which the pressure receiving pin fits.

Means for Solving the Problems

To solve the above-mentioned problem, a first aspect of the technique disclosed herein is directed to a mold degassing apparatus including: a fixed mold; a movable mold; an exhaust passage formed on a mating surface between the fixed mold and the movable mold and communicating with a cavity of a mold; a pressure receiving pin provided on an inlet side of the exhaust passage in the fixed mold in such a way as to be slidable toward the exhaust passage and toward a side opposite to the exhaust passage, and configured to slide toward the side opposite to the exhaust passage due to a flow pressure of molten metal that flows into the exhaust passage; a closing valve provided on an outlet side of the exhaust passage in the fixed mold, and configured to close the exhaust passage via an interlocking lever due to sliding of the pressure receiving pin toward the side opposite to the exhaust passage; and an air supply device that supplies air at a time of opening the movable mold. The pressure receiving pin includes a fitting portion that fits in a hole portion provided in the fixed mold and communicating with a portion of the exhaust passage on the inlet side, a distal end portion that is located coaxially with the fitting portion at a position closer to the exhaust passage than the fitting portion, that slides with respect to the hole portion upon reception of the molten metal, and that has a columnar shape, and an intermediate portion that is located coaxially with the fitting portion and the distal end portion at a position between the fitting portion and the distal end portion and that has a diameter smaller than a diameter of the distal end portion. The air supply device is provided such that the supplied air passes through a gap formed between an outer peripheral surface of the intermediate portion and an inner peripheral surface of the hole portion and a gap formed between the distal end portion and the fixed mold and flows out to the movable mold.

With such a configuration, air that flows out to the movable mold is supplied at the time of opening the movable mold and hence, even when a foreign substance enters the space formed between the outer peripheral surface of the pressure receiving pin and the inner peripheral surface of the hole portion during casting, it is possible to discharge the foreign substance with the pressure of air. Particularly, the intermediate portion having a diameter smaller than the diameter of the distal end portion is provided on the side opposite to the exhaust passage with respect to the distal end portion and hence, air supplied to the intermediate portion spreads over the entire intermediate portion in the circumferential direction and, thereafter, flows out to the movable mold. Therefore, it is possible to supply air to the entire portion of the hole portion on the side close to the movable mold, where a foreign substance is particularly liable to enter. As a result, it is possible to suppress deterioration of the slidability of the pressure receiving pin as much as possible.

In a second aspect of the technique disclosed herein, the fitting portion may include a sliding portion that slides with respect to the inner peripheral surface of the hole portion with a predetermined clearance, and a groove portion that extends in an axial direction of the pressure receiving pin and that forms a gap between the groove portion and the inner peripheral surface of the hole portion, the gap being larger than the predetermined clearance, and the air supply device may be configured to supply air into the gap formed between the outer peripheral surface of the intermediate portion and the inner peripheral surface of the hole portion through the groove portion at the time of opening the movable mold.

With such a configuration, air is supplied from the groove portion that is located on the side opposite to the exhaust passage with respect to the intermediate portion of the pressure receiving pin in the axial direction and hence, it is possible to supply air to the entire intermediate portion in the axial direction. Further, air is supplied to the intermediate portion through the groove portion and hence, it is possible to increase the flow of air flowing from the intermediate portion to the distal end portion. Therefore, a foreign substance can be more effectively discharged and hence, it is possible to suppress deterioration of the slidability of the pressure receiving pin as much as possible.

In a third aspect of the technique disclosed herein, in the apparatus according to the second aspect, the air supply device may be configured to supply air from the side opposite to the exhaust passage with respect to the fitting portion.

With such a configuration, air can be caused to pass over the entire pressure receiving pin in the axial direction and hence, it is possible to effectively remove a foreign substance. Therefore, it is possible to more effectively suppress deterioration of the slidability of the pressure receiving pin.

In a fourth aspect of the technique disclosed herein, in the apparatus according to the third aspect, the pressure receiving pin may further include a collar portion that is located on the side opposite to the exhaust passage with respect to the fitting portion, and that has a diameter larger than a largest diameter of the fitting portion, and a small diameter portion that is provided between the fitting portion and the collar portion, and that has a radius set to be equal to or less than a shortest distance from a center axis of the pressure receiving pin to the groove portion of the fitting portion. The collar portion may include a depression portion that communicates with a gap formed between an outer peripheral surface of the small diameter portion and the inner peripheral surface of the hole portion as viewed from the side opposite to the exhaust passage in the axial direction.

With such a configuration, the depression portion is provided and hence, even when the collar portion having a diameter larger than the diameter of the fitting portion is provided, it is possible to cause air to appropriately flow into the space formed between the outer peripheral surface of the small diameter portion and the inner peripheral surface of the hole portion. The air that flows into the space from the depression portion spreads in the space formed between the outer peripheral surface of the small diameter portion and the inner peripheral surface of the hole portion, and then flows into the groove portion. Thus, even when there is some degree of positional displacement between the depression portion and the groove portion in the circumferential direction of the pressure receiving pin, it is possible to cause air to appropriately flow into the groove portion. Therefore, it is possible to more effectively suppress deterioration of the slidability of the pressure receiving pin.

In a fifth aspect of the technique disclosed herein, in the apparatus according to the fourth aspect, the groove portion may be one of a plurality of groove portions formed at intervals in the circumferential direction of the fitting portion, and the depression portion may be one of a plurality of depression portions disposed at positions that overlap with the plurality of the groove portions as viewed from the side opposite to the exhaust passage in the axial direction.

With such a configuration, the plurality of groove portions and the plurality of depression portions are provided and hence, air can be caused to flow effectively. Further, the positions of the groove portions and the positions of the depression portions overlap with each other as viewed from the side opposite to the exhaust passage in the axial direction and hence, air flows easily. Therefore, it is possible to more effectively suppress deterioration of the slidability of the pressure receiving pin.

In a sixth aspect of the technique disclosed herein, in the apparatus according to any one of the first to fifth aspects, the plurality of groove portions may be formed at equal intervals in the circumferential direction of the fitting portion.

With such a configuration, it is possible to cause air to uniformly flow through the space formed between the outer peripheral surface of the pressure receiving pin and the inner peripheral surface of the hole portion and hence, an uneven distribution of foreign substances caused by an uneven air flow rate can be suppressed. Therefore, it is possible to more effectively suppress deterioration of the slidability of the pressure receiving pin.

In a seventh aspect of the technique disclosed herein, in the apparatus according to the first aspect, an outer diameter of the distal end portion may be equal to a largest diameter of the fitting portion.

With such a configuration, the gap formed between the outer peripheral surface of the distal end portion and the inner peripheral surface of the hole portion can be reduced as much as possible and hence, it is possible to suppress entrance of a foreign substance into the gap. Even if a foreign substance enters the gap, it is possible to discharge the foreign substance with air. Accordingly, it is possible to more effectively suppress deterioration of the slidability of the pressure receiving pin.

Advantageous Effect of Invention

As described above, according to the technique disclosed herein, it is possible to suppress, as much as possible, a situation in which the slidability of the pressure receiving pin is deteriorated by a foreign substance that enters the gap formed between the outer peripheral surface of the pressure receiving pin and the inner peripheral surface of the hole portion into which the pressure receiving pin fits.

MODE FOR CARRYING OUT THE INVENTION

Hereinafter, an exemplary embodiment will be described in detail with reference to drawings.

Figure 1:
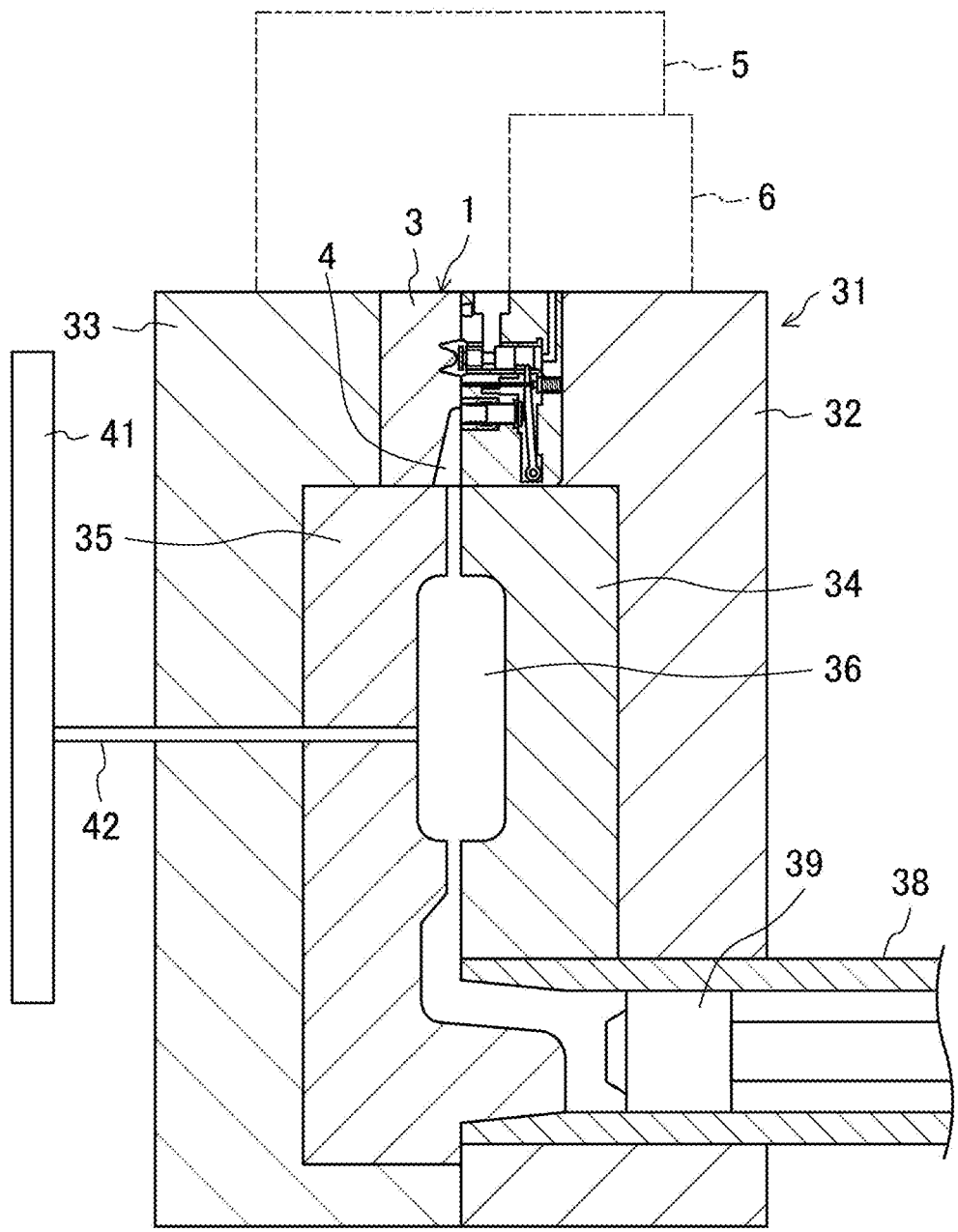
FIG. 1 is a cross-sectional view showing a basic configuration of a die casting mold provided with a mold degassing apparatus according to an exemplary embodiment.
Figure 2:
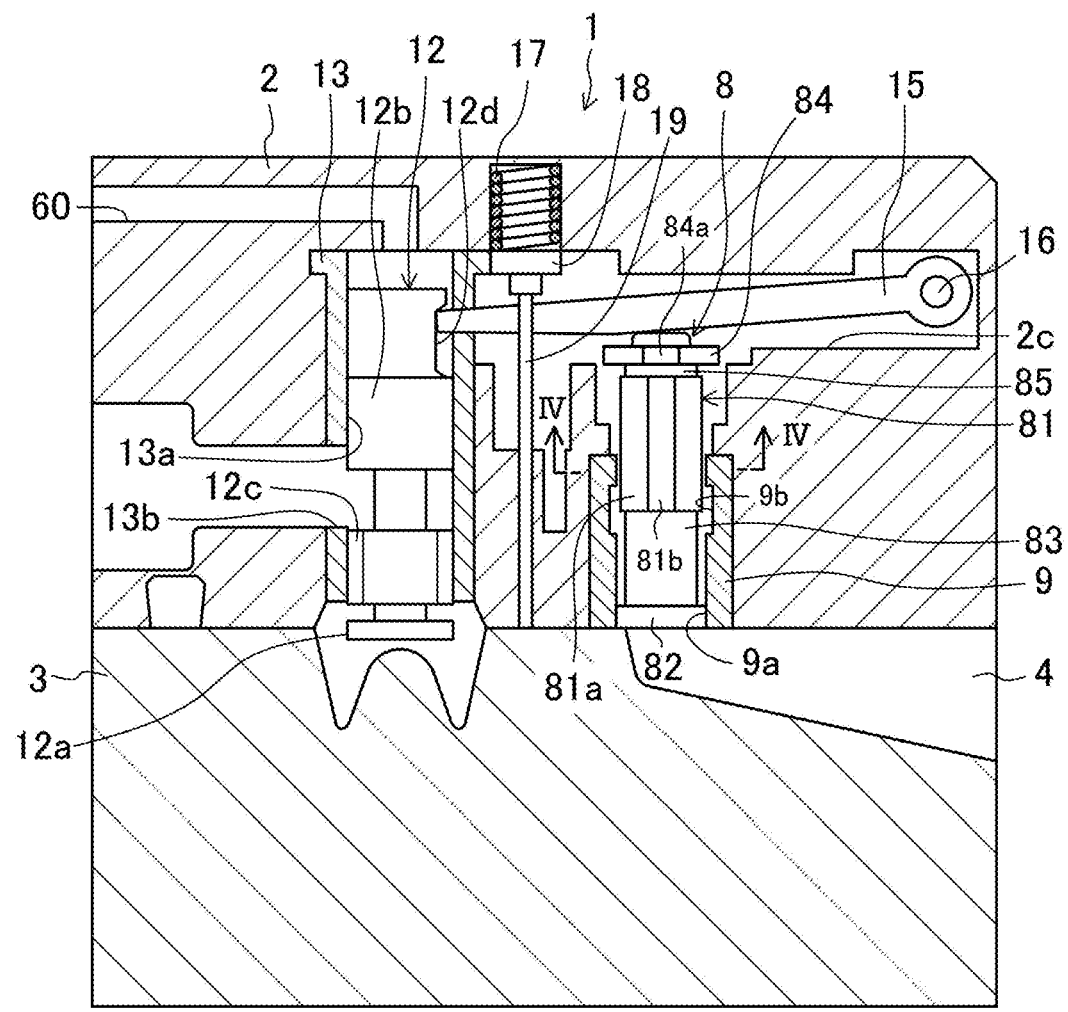
FIG. 2 is a cross-sectional view showing a detailed configuration of the mold degassing apparatus, and shows a state in which an exhaust passage is open.
Figure 3:
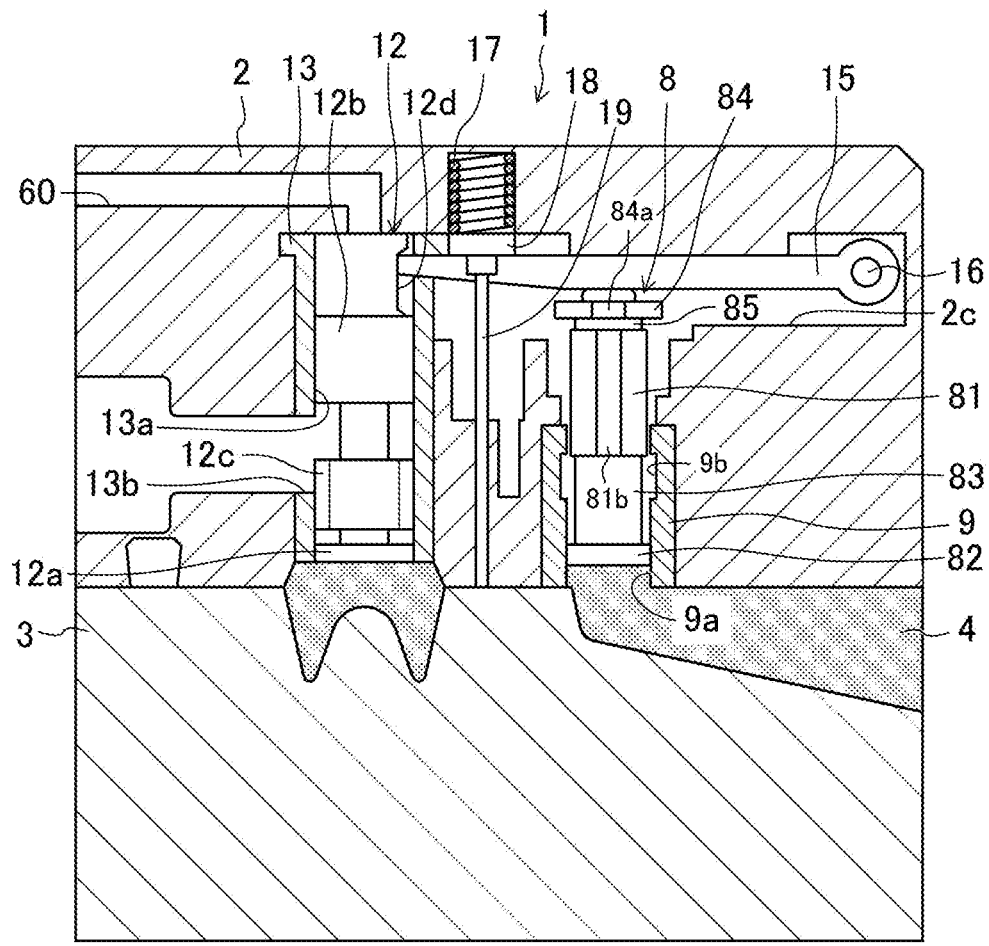
FIG. 3 is a cross-sectional view showing the detailed configuration of the mold degassing apparatus, and shows a state in which the exhaust passage is closed.

FIG. 1 shows a basic configuration of a die casting mold 31 (hereinafter simply referred to as "mold 31") provided with a mold degassing apparatus 1 according to this embodiment, and FIG. 2 and FIG. 3 show details of the mold degassing apparatus 1.

The mold 31 includes a fixed main mold 32 and a movable main mold 33 that moves in the direction approaching or separating from the fixed main mold 32 (in the left-right direction in FIG. 1). The fixed main mold 32 is provided with a fixed cavity mold 34. The movable main mold 33 is provided with a movable cavity mold 35 such that the movable cavity mold 35 moves together with the movable main mold 33. A mating surface between the fixed cavity mold 34 and the movable cavity mold 35 has a cavity 36 for forming a cast product (an aluminum cast product, a magnesium cast product, or the like).

The fixed main mold 32 has an injection sleeve 38 that communicates with the cavity 36, and an injection piston 39 is fitted and inserted in the injection sleeve 38. Molten metal (aluminum molten metal, magnesium molten metal, or the like) in the injection sleeve 38 is extruded by the injection piston 39, thus being filled into the cavity 36.

The movable main mold 33 is provided with a pressing plate 41 and an extrusion pin 42. After a cast product is formed in the cavity 36 and the mold 31 is opened, the pressing plate 41 and the extrusion pin 42 are used for pushing out the cast product.

The mold degassing apparatus 1 is provided on the side (the upper side in FIG. 1) opposite to the side (the lower side in FIG. 1) on which molten metal is filled, with the cavity 36 interposed therebetween. The mold degassing apparatus 1 includes a fixed mold 2, which is provided to the fixed main mold 32, and a movable mold 3, which is provided to the movable main mold 33 and which moves together with the movable main mold 33. The movable mold 3 is movable in the direction approaching or separating from the fixed mold 2 (in the left-right direction in FIG. 1, and in the up-down direction in FIG. 2 and FIG. 3). A mating surface between the fixed mold 2 and the movable mold 3 has an exhaust passage 4 that communicates with the cavity 36 to discharge gas from the cavity 36.

In the present embodiment, the intermediate portion of the exhaust passage 4 in the length direction is formed on the mating surface between the fixed mold 2 and the movable mold 3. The portion of the exhaust passage 4 on a cavity side (inlet side) is formed on the mating surface between the fixed cavity mold 34 and the movable cavity mold 35, and is connected to the cavity 36. In contrast, the portion of the exhaust passage 4 on the outlet side is formed in a valve bush 13, which will be described later, and in the fixed mold 2. The outlet of the exhaust passage 4 is connected to a suction device 5 that suctions gas from the cavity 36.

The portion of the exhaust passage 4 that is formed in the movable mold 3 extends from the inlet side (the right side in FIG. 2 and FIG. 3) to a position that faces the distal end surface of a pressure receiving pin 8, which will be described later, and, thereafter, passes through the viewer's side and the back side of the paper surface on which FIG. 2 or FIG. 3 is shown (makes a detour), and then reaches a position that faces a valve body portion 12*a* of a closing valve 12, which will be described later.

The mold degassing apparatus 1 includes the pressure receiving pin 8 and the closing valve 12, the pressure receiving pin 8 being provided on the inlet side (the right side in FIG. 2 and FIG. 3) of the exhaust passage 4 in the fixed mold 2, the closing valve 12 being provided on the outlet side (the left side in FIG. 2 and FIG. 3) of the exhaust passage 4 in the fixed mold 2.

The pressure receiving pin 8 is provided such that the center axis of the pressure receiving pin 8 extends in the direction perpendicular to the mating surface between the fixed mold 2 and the movable mold 3, and the pressure receiving pin 8 is slidable toward the exhaust passage 4 (toward the movable mold 3) and toward the side opposite to the exhaust passage 4 (toward the side opposite to the movable mold 3) in the above-mentioned direction. The pressure receiving pin 8 is disposed in a through hole 2*a* (see FIG. 6 or the like) provided in the fixed mold 2. A portion of the through hole 2*a* is formed by a fitting hole 9*a* that penetrates through the center portion of a pin bush 9, which is fixed to the fixed mold 2 and having a cylindrical shape, toward the exhaust passage 4.

The pressure receiving pin 8 includes a fitting portion 81, a distal end portion 82, and an intermediate portion 83, the fitting portion 81 fitting in the fitting hole 9*a*, the distal end portion 82 being located at a position closer to the exhaust passage 4 than the fitting portion 81 in the axial direction and having a columnar shape, the intermediate portion 83 being located between the fitting portion 81 and the distal end portion 82 in the axial direction, having a diameter smaller than the diameter of the distal end portion 82, and having a columnar shape. The pressure receiving pin 8 also includes a collar portion 84 and a small diameter portion 85, the collar portion 84 being located on the side opposite to the exhaust passage 4 with respect to the fitting portion 81 and having a diameter larger than the largest diameter of the fitting portion 81, the small diameter portion 85 being provided between the fitting portion 81 and the collar portion 84, and having a radius set to be slightly smaller than the shortest distance from the center axis of the pressure receiving pin 8 to a groove portion 81*b*, which will be described later, of the fitting portion 81. The fitting portion 81, the distal end portion 82, the intermediate portion 83, the collar portion 84, and the small diameter portion 85 are disposed coaxially. The pressure receiving pin 8, particularly, the fitting portion 81 and the distal end portion 82 slide with respect to the fitting hole 9*a* of the pin bush 9. When molten metal that flows into the exhaust passage 4 comes into contact with the surface of the distal end portion 82 on the exhaust passage 4 side and the molten metal presses the pressure receiving pin 8 toward the side opposite to the exhaust passage 4 by the flow pressure of the molten metal, the pressure receiving pin 8 slides toward the side opposite to the exhaust passage 4 along the axial direction.

The largest diameter of the fitting portion 81 and the diameter of the distal end portion 82 are equal to each other, and the fitting portion 81 and the distal end portion 82 slide with respect to the inner peripheral surface of the fitting hole 9a of the pin bush 9 with a predetermined clearance. The predetermined clearance is set to a value that allows the pressure receiving pin 8 to smoothly slide without causing looseness. The predetermined clearance is set to a range from 0.01 mm to 0.025 mm, for example.

Figure 4:
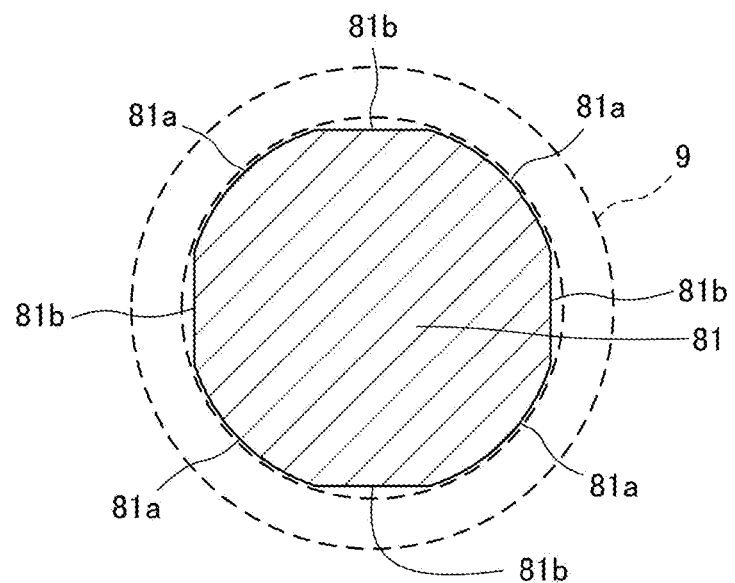
FIG. 4 is a cross-sectional view taken along a plane corresponding to the line IV-IV in FIG. 2.

As shown in FIG. 4, the fitting portion 81 includes sliding portions 81a and the groove portions 81b, the sliding portions 81a sliding with respect to the fitting hole 9a, the groove portions 81b extending in the axial direction of the pressure receiving pin 8 and forming gaps larger than the predetermined clearance with respect to the inner peripheral surface of the fitting hole 9a. A plurality of (four in this embodiment) groove portions 81b are provided, and are formed at equal intervals in the circumferential direction of the fitting portion 81. Each groove portion 81b is formed by cutting a portion of the outer peripheral portion of a column into a flat shape.

The distal end portion 82 is configured such that, as shown in FIG. 2 and FIG. 3, in a state in which the fixed mold 2 and the movable mold 3 are clamped, the distal end portion 82 is pressed by a portion of the movable mold 3, so that the distal end surface of the distal end portion 82 is coplanar with the mating surface between the fixed mold 2 and the movable mold 3. In contrast, when the fixed mold 2 and the movable mold 3 are opened, the pressure receiving pin 8 moves toward the movable mold 3, so that the entire distal end portion 82 is exposed at a position closer to the movable mold 3 than the surface of the fixed mold 2 on the movable mold 3 side (see FIG. 8). In other words, the length of the distal end portion 82 in the axial direction is set to a length that allows the entire distal end portion 82 to be exposed at the position closer to the movable mold 3 than the surface of the fixed mold 2 on the movable mold 3 side when the fixed mold 2 and the movable mold 3 are opened.

The intermediate portion 83 has a diameter smaller than the diameters of the fitting portion 81 and the distal end portion 82, thus forming a gap larger than the predetermined clearance between the intermediate portion 83 and the inner peripheral surface of the fitting hole 9a. With the formation of this gap, it is possible to reduce sliding friction of the pressure receiving pin as much as possible.

The collar portion 84 is a portion that restricts the movement of the pressure receiving pin 8 in the axial direction in order to prevent the pressure receiving pin 8 from falling off from the fixed mold 2 when the fixed mold 2 and the movable mold 3 are opened. Specifically, a step portion is provided at the end portion of the through hole 2a of the fixed mold 2 on the side opposite to the exhaust passage 4, the step portion including a contact portion 2b (see FIG. 6 or the like) with which the collar portion 84 comes into contact when the pressure receiving pin 8 moves toward the movable mold 3. The collar portion 84 comes into contact with the contact portion 2b when the pressure receiving pin 8 slides toward the movable mold 3 at the time of opening the mold. When the collar portion 84 is in contact with the contact portion 2b, the pressure receiving pin 8 is prevented from sliding toward the movable mold 3 from the position at which the collar portion 84 is in contact with the contact portion 2b. The depth of the step portion is set to be larger than the length of the distal end portion 82 in the axial direction. With such a configuration, when the pressure receiving pin 8 moves toward the movable mold 3 due to the opening of the mold, the entire distal end portion 82 can be exposed at a position closer to the movable mold 3 than the surface of the fixed mold 2 on the movable mold 3 side.

Figure 5:
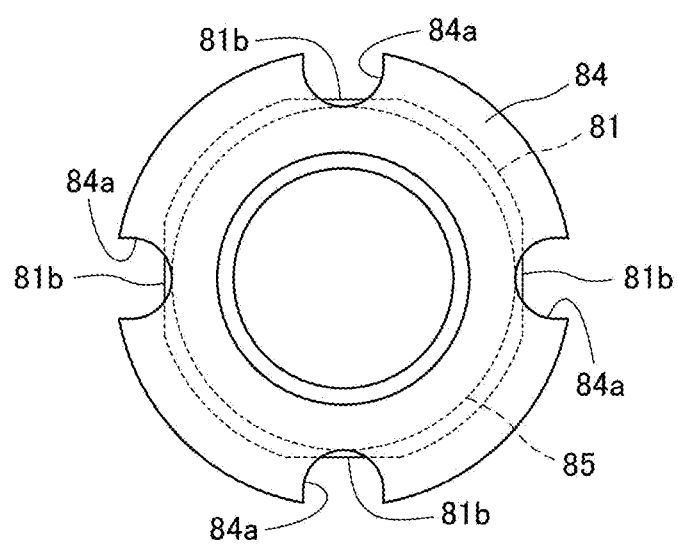
FIG. 5 is a diagram of a pressure receiving pin as viewed from the collar side in the axial direction.

As shown in FIG. 5, the collar portion 84 includes, as viewed from the side opposite to the exhaust passage 4 in the axial direction, depression portions 84a that communicate with the gap formed between the outer peripheral surface of the small diameter portion 85 and the inner peripheral surface of the through hole 2a. A plurality of (four in this embodiment) depression portions 84a are provided, and are disposed at positions that overlap with the groove portions 81b as viewed from the side opposite to the exhaust passage 4 in the axial direction. The respective depression portions 84a are arranged at equal intervals in the circumferential direction of the collar portion 84. The depth of each depression portion 84a is set to a depth that allows the deepest portion to reach the outer peripheral surface of the small diameter portion 85. That is, the deepest portion of each depression portion 84a is located at a position closer to the center axis of the pressure receiving pin 8 than the bottom portion of the groove portion 81b of the fitting portion 81.

A large diameter portion 9b is formed on the inner peripheral surface of the fitting hole 9a of the pin bush 9 at the intermediate portion in the axial direction of the bush, the large diameter portion 9b having an inner diameter larger than the inner diameters of other portions. With the formation of the large diameter portion 9b, it is possible to reduce sliding friction of the pressure receiving pin 8 as much as possible.

In the same manner as the pressure receiving pin 8, the closing valve 12 extends in the direction perpendicular to the mating surface between the fixed mold 2 and the movable mold 3. The closing valve 12 includes the valve body portion 12a, having a disc shape, at the end portion on the movable mold 3 side in the axial direction of the closing valve 12, and includes a sliding portion 12b at the intermediate portion in the axial direction of the closing valve 12, the sliding portion 12b being fitted in and sliding within a through hole 13a that penetrates through the center portion of the valve bush 13 fixed to the fixed mold 2 and having a cylindrical shape. With the sliding of the sliding portion 12b, the closing valve 12 slides toward the movable mold 3 and toward the side opposite to the movable mold 3 in the axial direction of the closing valve 12.

The portion of the through hole 13a of the valve bush 13 on the side close to the movable mold 3 forms a portion of the exhaust passage 4, and is connected to the outlet of the exhaust passage 4 (the suction device 5) through a communication hole 13b, which is formed in the peripheral side surface of the valve bush 13, and through the portion of the exhaust passage 4 that is formed in the fixed mold 2. The opening end of the through hole 13a of the valve bush 13 on the side close to the movable mold 3 is connected to the portion of the exhaust passage 4 that faces the valve body portion 12a.

The valve body portion 12a is configured to close the opening end of the through hole 13a of the valve bush 13 on the side close to the movable mold 3 (that is, to close the exhaust passage 4) when the closing valve 12 slides toward the side opposite to the movable mold 3. The valve body portion 12a is configured to open the above-mentioned opening end (that is, to open the exhaust passage 4) when the closing valve 12 slides toward the movable mold 3.

The portion of the closing valve 12 that is located in the exhaust passage 4 formed by the through hole 13a has a shape in which a cylinder, having an outer diameter substantially equal to the inner diameter of the through hole 13a, has notched portions 12c formed at three positions in the circumferential direction of the cylinder. A space formed between each notched portion 12c and the inner peripheral surface of the through hole 13a forms the exhaust passage 4. In FIG. 2 and FIG. 3, of the notched portions 12c formed at three positions, only the notched portions 12c formed at two positions can be seen. The remaining one position is disposed on the back side of the paper surface on which FIG. 2 and FIG. 3 is shown, thus cannot be seen.

The closing valve 12 is configured to close the exhaust passage 4 via an interlocking lever 15 due to the sliding of the pressure receiving pin 8 toward the side opposite to the exhaust passage 4. Specifically, the interlocking lever 15 is disposed in a lever chamber 2c formed in the fixed mold 2 on the side opposite to the exhaust passage 4 with respect to the pressure receiving pin 8. The interlocking lever 15 is configured to be capable of swinging (rotating) about a swinging shaft 16, which extends in the direction perpendicular to the plane including the center axis of the pressure receiving pin 8 and the center axis of the closing valve 12 (the direction perpendicular to the paper surface in FIG. 2). The swinging shaft 16 is provided at a position closer to the inlet side of the exhaust passage 4 than the pressure receiving pin 8. The interlocking lever 15 extends along the above-mentioned plane from the swinging shaft 16 to the position of an engagement recessed portion 12d, which will be described later, of the closing valve 12.

The distal end portion of the interlocking lever 15 engages with the engagement recessed portion 12d, which is provided on the peripheral side surface of the closing valve 12 at a position in the vicinity of the end portion on the side opposite to the movable mold 3 in the axial direction of the closing valve 12. The intermediate portion of the interlocking lever 15 in the length direction and the rear end surface of the pressure receiving pin 8 have a positional relationship in which the intermediate portion of the interlocking lever 15 and the rear end surface of the pressure receiving pin 8 can come into contact with each other. In the state in which the mold 31 is opened, the interlocking lever 15 is urged in the counterclockwise direction in FIG. 2 about the swinging shaft 16 by a compression spring 17 via a pressing plate 18 extending in the direction perpendicular to the above-mentioned plane. With such an operation, the rear end surface of the pressure receiving pin 8 is pressed by the interlocking lever 15, so that the pressure receiving pin 8 slides toward the exhaust passage 4. The closing valve 12 slides toward the movable mold 3, thus opening the exhaust passage 4.

When the mold 31 is brought into a clamped state (the state shown in FIG. 2) from such a state, the pressing plate 18 is pressed by the movable mold 3 toward the side opposite to the movable mold 3 against the urging force of the compression spring 17 via a pressing pin 19. With such an operation, the urging force of the compression spring 17 stops acting on the interlocking lever 15. The force also stops acting on the pressure receiving pin 8 and the closing valve 12 and hence, as shown in FIG. 2, the pressure receiving pin 8 and the closing valve 12 are located at positions pressed by the interlocking lever 15 as described above. That is, the closing valve 12 is in a state of opening the exhaust passage 4. As described above, when the mold 31 is in a clamped state, the pressure receiving pin 8 is in a state of being pressed also by the movable mold 3 and hence, even when the pressure receiving pin 8 is pressed by the interlocking lever 15, the pressure receiving pin 8 does not move toward the exhaust passage 4.

After the mold 31 is brought into a clamped state, molten metal is filled into the cavity 36 by the injection piston 39. In filling the molten metal into the cavity 36, the suction device 5 is actuated, so that gas is discharged from the cavity 36 through the exhaust passage 4.

After the molten metal is filled into the cavity 36, the molten metal flows into the exhaust passage 4. This molten metal reaches the position that faces the distal end surface of the pressure receiving pin 8, and the pressure receiving pin 8 slides toward the side opposite to the exhaust passage 4 due to the flow pressure of the molten metal. Due to the sliding of the pressure receiving pin 8, the intermediate portion of the interlocking lever 15 in the length direction is pressed by the rear end surface of the pressure receiving pin 8 toward the side opposite to the movable mold 3. With such an operation, as shown in FIG. 3, the interlocking lever 15 rotates in the clockwise direction about the swinging shaft 16. Due to the rotation of the interlocking lever 15, the closing valve 12 slides toward the side opposite to the movable mold 3, thus closing the exhaust passage 4. Simultaneously with such a closing operation of the closing valve 12, the molten metal flows toward the position that faces the valve body portion 12a of the closing valve 12 from the position that faces the distal end surface of the pressure receiving pin 8. However, because of the detouring of the exhaust passage 4, the closing valve 12 closes the exhaust passage 4 before the molten metal reaches the position that faces the valve body portion 12a. With such a configuration, the molten metal that flows into the exhaust passage 4 is prevented from flowing to the portions of the exhaust passage 4 downstream of the valve body portion 12a of the closing valve 12 (subsequently, to the suction device 5).

The predetermined clearance is formed between the outer peripheral surface of the pressure receiving pin 8 and the inner peripheral surface of the fitting hole 9a of the pin bush 9, particularly, between the distal end portion 82 and the inner peripheral surface of the fitting hole 9a, and hence, a foreign substance, such as cavity lubricating oil or molten metal, may enter the clearance portion. When a large number of cast products are continued to be repeatedly casted with the cavity, the pressure receiving pin 8 eventually becomes less likely to slide due to the foreign substance that enters the clearance portion, so that there is a concern that it becomes impossible to close the exhaust passage 4 with the closing valve 12. Particularly, a foreign substance that passes through the clearance portion is likely to remain at the distal end portion 82 and the intermediate portion 83 of the pressure receiving pin 8, thus easily causing sliding failure of the pressure receiving pin 8.

In view of the above, in the present embodiment, when the fixed mold 2 and the movable mold 3 are opened, air is supplied to the space formed between the inner peripheral surface of the through hole 2a and the outer peripheral surface of the pressure receiving pin 8 to remove a foreign substance.

As shown in FIG. 2 and FIG. 3, an air supply passage 60 is formed in the fixed mold 2 on the side opposite to the exhaust passage 4 with respect to a portion at which the closing valve 12 is disposed. As shown in FIG. 1, an air supply device 6 is provided at the inlet of the air supply passage 60 (on the upper side in FIG. 1, on the left side in FIG. 2 and FIG. 3). Air supplied from the air supply device 6 passes through the gap formed between the sliding portion 12b of the closing valve 12 and the fixed mold 2 and enters the lever chamber 2c and, thereafter, enters a space formed between the inner peripheral surface of the through hole 2a and the outer peripheral surface of the pressure receiving pin 8 from the side opposite to the exhaust passage 4. Then, the air passes through the depression portions 84a and the groove portions 81b and enters the space formed between the outer peripheral surface of the pressure receiving pin 8 and the inner peripheral surface of the fitting hole 9a and, thereafter, flows out to the movable mold 3. With such a configuration, a foreign substance in the space formed between the inner peripheral surface of the fitting hole 9*a* and the distal end portion 82 or in the space formed between the inner peripheral surface of the fitting hole 9*a* and the intermediate portion 83 is discharged toward the movable mold 3 by the flow pressure of the air.

Next, a series of operations of the pressure receiving pin 8 will be described with reference to FIG. 6 to FIG. 8.

Figure 6:
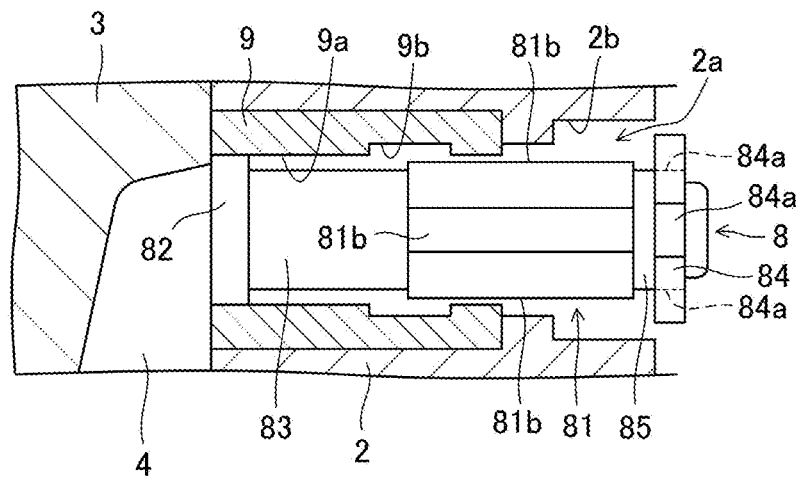
FIG. 6 is an enlarged cross-sectional view showing the pressure receiving pin and an area around the pressure receiving pin in an enlarged manner, and shows a state in which a fixed mold and a movable mold are clamped.

First, as shown in FIG. 6, in a state in which the fixed mold 2 and the movable mold 3 are clamped, the pressure receiving pin 8 is pressed by the portion of the movable mold 3, thus sliding toward the side opposite to the exhaust passage 4. At this point of operation, the distal end surface of the distal end portion 82 is coplanar with the mating surface between the fixed mold 2 and the movable mold 3.

Figure 7:
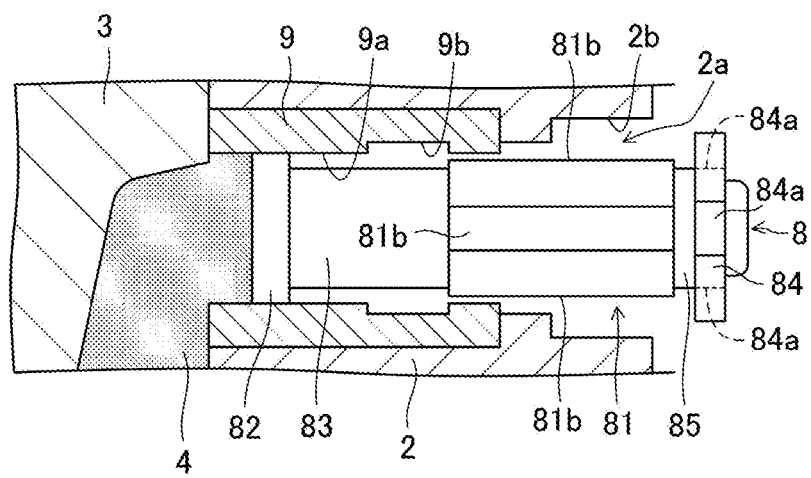
FIG. 7 is an enlarged cross-sectional view showing the pressure receiving pin and the area around the pressure receiving pin in an enlarged manner, and shows a state in which the pressure receiving pin is pushed up by molten metal.
Figure 8:
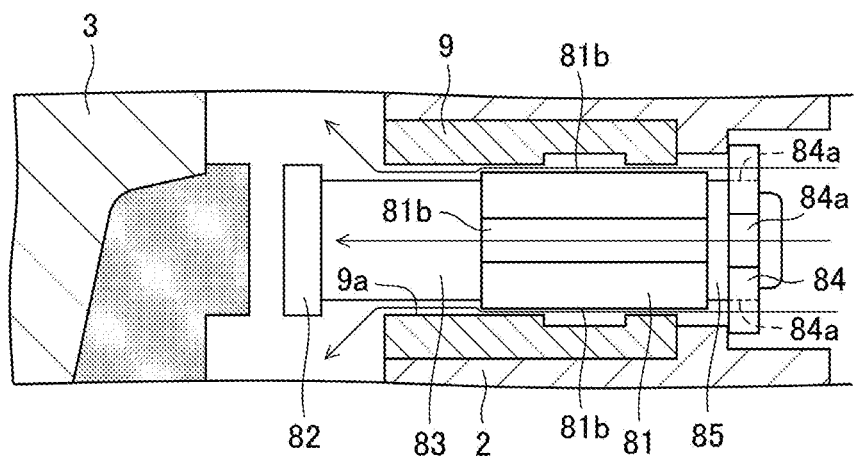
FIG. 8 is an enlarged cross-sectional view showing the pressure receiving pin and the area around the pressure receiving pin in an enlarged manner, and shows a state in which the fixed mold and the movable mold are opened.

When molten metal is supplied from the state shown in FIG. 6, as shown in FIG. 7, the pressure receiving pin 8 slides toward the side opposite to the exhaust passage 4 due to the flow pressure of the molten metal. At this point of operation, a slight amount of foreign substance intrudes from the clearance portion formed between the outer peripheral portion of the distal end portion 82 and the inner peripheral surface of the fitting hole 9*a*.

When cooling of the molten metal is completed from the state shown in FIG. 7 and the fixed mold 2 and the movable mold 3 are opened, the interlocking lever 15 is pressed by the compression spring 17, thus being rotated, so that the pressure receiving pin 8 slides toward the exhaust passage 4. After the lapse of a predetermined time from the starting of opening of the mold, as shown in FIG. 8, the entire distal end portion 82 is located at a position closer to the movable mold 3 than the surface of the fixed mold 2 on the movable mold 3 side. With such an operation, a relatively large gap is formed between the end portion of the through hole 2*a* on the movable mold 3 side and the pressure receiving pin 8. The air supply device 6 is actuated at this timing, so that air is supplied into the fixed mold 2. The predetermined time is 5 seconds, for example. An air supply time is 5 seconds, for example. The air supply timing and the air supply time are controlled by a control device not shown in the drawing, and may be suitably set by a worker.

The air that enters the lever chamber 2*c* through the air supply passage 60 intrudes into a space formed between the outer peripheral surface of the small diameter portion 85 and the inner peripheral surface of the through hole 2*a* from the depression portions 84*a* of the collar portion 84. The depression portions 84*a* and the groove portions 81*b* of the fitting portion 81 overlap with each other in the axial direction of the pressure receiving pin 8 and hence, the air passes through the groove portions 81*b* and intrudes into the space formed between the outer peripheral surface of the intermediate portion 83 and the inner peripheral surface of the fitting hole 9*a*. The air that intrudes into the space formed between the outer peripheral surface of the intermediate portion 83 and the inner peripheral surface of the fitting hole 9*a* spreads around the intermediate portion 83 and, thereafter, passes through the space formed between the distal end portion 82 and the fixed mold 2 toward the movable mold 3. Due to the flow pressure of the air at this point of operation, a foreign substance in the space formed between the inner peripheral surface of the fitting hole 9*a* and the distal end portion 82 or in the space formed between the inner peripheral surface of the fitting hole 9*a* and the intermediate portion 83 is discharged toward the movable mold 3.

As described above, the deepest portion of each depression portion 84*a* is located at the position closer to the center axis of the pressure receiving pin 8 than the bottom portion of the groove portion 81*b* of the fitting portion 81 and hence, even when the collar portion 84 comes into contact with the locking portion 2*b*, air can pass through the depression portions 84*a* and the groove portions 81*b*. Therefore, after the lapse of a predetermined time from the starting of opening of the mold, a state is always maintained in which air can pass through the space toward the movable mold 3.

Accordingly, according to this embodiment, the pressure receiving pin 8 of the mold degassing apparatus 1 includes the fitting portion 81 that fits in the through hole 2*a* provided in the fixed mold 2 and communicating with the portion of the exhaust passage 4 on the inlet side, the distal end portion 82 that is located coaxially with the fitting portion 81 at a position closer to the exhaust passage 4 than the fitting portion 81, that slides with respect to the through hole 2*a* upon reception of molten metal, and that has a columnar shape, and the intermediate portion 83 that is located coaxially with the fitting portion 81 and the distal end portion 82 at a position between the fitting portion 81 and the distal end portion 82 and that has a diameter smaller than the diameter of the distal end portion 82. The pressure receiving pin 8 of the mold degassing apparatus 1 further includes the air supply device 6 that supplies air at the time of opening the movable mold 3 such that the air passes through the gap formed between the outer peripheral surface of the intermediate portion 83 and the inner peripheral surface of the through hole 2*a* and the gap formed between the distal end portion 82 and the fixed mold 2, and flows out to the movable mold 3. With such a configuration, even when a foreign substance enters the space formed between the outer peripheral surface of the pressure receiving pin 8 and the inner peripheral surface of the through hole 2*a* during casting, it is possible to discharge the foreign substance with the flow pressure of the air. Particularly, the intermediate portion 83 having a diameter smaller than the diameter of the distal end portion 82 is provided on the side opposite to the exhaust passage with respect to the distal end portion 82 and hence, air supplied to the intermediate portion 83 spreads over the entire intermediate portion 83 in the circumferential direction and, thereafter, flows out to the movable mold 3. Therefore, it is possible to supply air to the entire portion of the through hole 2*a* on the side close to the movable mold 3, where a foreign substance is particularly liable to enter. As a result, it is possible to suppress deterioration of the slidability of the pressure receiving pin 8 as much as possible.

In the present embodiment, the fitting portion 81 includes the sliding portions 81*a* that slide with respect to the inner peripheral surface of the through hole 2*a* with a predetermined clearance, and the groove portions 81*b* that extend in the axial direction of the pressure receiving pin 8 and that form gaps between the groove portions 81*b* and the inner peripheral surface of the through hole 2*a*, each gap being larger than the predetermined clearance, and the air supply device 6 is configured to supply air into the gap formed between the outer peripheral surface of the intermediate portion 83 and the inner peripheral surface of the through hole 2*a* through the groove portions 81*b* at the time of opening the movable mold 3. With such a configuration, air is supplied from the groove portions 81*b* that are located on the side opposite to the exhaust passage 4 with respect to the intermediate portion 83 of the pressure receiving pin 8 in the axial direction and hence, it is possible to supply air to the entire intermediate portion 83 in the axial direction. Further, air is supplied to the intermediate portion 83 through the groove portions 81*b* and hence, it is possible to increase the flow of air flowing from the intermediate portion 83 toward the distal end portion 82 as much as possible. As a result, a foreign substance can be more effectively discharged and hence, it is possible to suppress deterioration of the slidability of the pressure receiving pin 8 as much as possible.

In the present embodiment, the air supply device 6 is configured to supply air from the side opposite to the exhaust passage with respect to the fitting portion 81. With such a configuration, air can be caused to pass over the entire pressure receiving pin 8 in the axial direction and hence, it is possible to effectively remove a foreign substance. As a result, it is possible to more effectively suppress deterioration of the slidability of the pressure receiving pin 8.

In the present embodiment, the pressure receiving pin 8 includes the collar portion 84 that is located on the side opposite to the exhaust passage 4 with respect to the fitting portion 81, and that has a diameter larger than the largest diameter of the fitting portion 81, and the small diameter portion 85 that is provided between the fitting portion 81 and the collar portion 84, and that has a radius set to be equal to or less than the shortest distance from the center axis of the pressure receiving pin 8 to the groove portion 81b of the fitting portion 81. The collar portion 84 includes the depression portions 84a that communicate with the gap formed between the outer peripheral surface of the small diameter portion 85 and the inner peripheral surface of the through hole 2a as viewed from the side opposite to the exhaust passage 4 in the axial direction. With such a configuration, the depression portions 84a are provided and hence, even when the collar portion 84 having a diameter larger than the diameter of the fitting portion 81 is provided, it is possible to cause air to appropriately flow into the space formed between the outer peripheral surface of the small diameter portion 85 and the inner peripheral surface of the through hole 2a. The air that flows into the space from the depression portions 84a spreads in the space formed between the outer peripheral surface of the small diameter portion 85 and the inner peripheral surface of the through hole 2a, and then flows into the groove portions 81b. Thus, even when there is some degree of positional displacement between the depression portions 84a and the groove portions 81b in the circumferential direction of the pressure receiving pin 8, it is possible to cause air to appropriately flow into the groove portions 81b. Therefore, it is possible to more effectively suppress deterioration of the slidability of the pressure receiving pin 8.

In the present embodiment, the plurality of groove portions 81b are provided, and are formed at intervals in the circumferential direction of the fitting portion 81, and the plurality of depression portions 84a are provided, and are disposed at positions that overlap with the respective groove portions 81b as viewed from the side opposite to the exhaust passage 4 in the axial direction of the pressure receiving pin 8. With such a configuration, the plurality of groove portions 81b and the plurality of depression portions 84a are provided and hence, air can be caused to flow effectively. Further, the positions of the groove portions 81b and the positions of the depression portions 84a overlap with each other as viewed from the side opposite to the exhaust passage 4 in the axial direction and hence, air flows easily. As a result, it is possible to more effectively suppress deterioration of the slidability of the pressure receiving pin 8.

In the present embodiment, the plurality of groove portions 81b are provided, and are formed at equal intervals in the circumferential direction of the fitting portion 81. With such a configuration, it is possible to cause air to uniformly flow through the space formed between the outer peripheral surface of the pressure receiving pin 8 and the inner peripheral surface of the through hole 2a and hence, an uneven distribution of foreign substances caused by an uneven air flow rate can be suppressed. As a result, it is possible to more effectively suppress deterioration of the slidability of the pressure receiving pin 8.

In the present embodiment, the outer diameter of the distal end portion 82 is equal to the largest diameter of the fitting portion 81. With such a configuration, the gap formed between the outer peripheral surface of the distal end portion 82 and the inner peripheral surface of the through hole 2a can be narrowed as much as possible and hence, it is possible to suppress entrance of a foreign substance into the gap. Even if a foreign substance enters the gap, it is possible to discharge the foreign substance with air. Accordingly, it is possible to more effectively suppress deterioration of the slidability of the pressure receiving pin 8.

In the present embodiment, the step portion is provided to the fixed mold 2, the step portion including the contact portion 2b with which the collar portion 84 comes into contact when the pressure receiving pin 8 moves toward the movable mold 3 due to opening of the fixed mold 2 and the movable mold 3, and the depth of the step portion is set to be larger than the length of the distal end portion 82 in the axial direction of the pressure receiving pin 8. With such a configuration, when the pressure receiving pin 8 moves toward the movable mold 3 due to opening of the mold, the entire distal end portion 82 can be exposed at the position closer to the movable mold 3 than the surface of the fixed mold 2 on the movable mold 3 side. As a result, it is possible to discharge a foreign substance with high efficiency by causing air to efficiently pass through the space toward the movable mold 3.

The technique disclosed in the present embodiment is not limited to the above-described embodiment, and substitutions may be made without departing from the gist of claims.

For example, in the above-described embodiment, the air supply device 6 is configured to supply air from the side opposite to the exhaust passage with respect to the fitting portion 81. However, the configuration is not limited to the above. Provided that air can be supplied such that the air passes through the gap formed between the outer peripheral surface of the intermediate portion 83 and the inner peripheral surface of the through hole 2a and the gap formed between the distal end portion 82 and the fixed mold 2 and, then, flows out to the movable mold 3, a configuration may be adopted in which air is supplied into the through hole 2a from the intermediate portion of the pressure receiving pin 8 in the axial direction. Particularly, in the case of a configuration in which the fixed mold 2 is provided with an air supply passage that communicates with the gap formed between the outer peripheral surface of the intermediate portion 83 and the inner peripheral surface of the through hole 2a, so that air supplied from the air supply device 6 can be directly supplied to the gap, it is not always necessary to provide the groove portions 81b to the fitting portion 81.

In the above-described embodiment, the respective depression portions 84a are disposed to overlap with the respective groove portions 81b of the pressure receiving pin 8 as viewed from the side opposite to the exhaust passage 4 in the axial direction of the pressure receiving pin 8. However, the configuration is not limited to the above, and it is not always necessary for the respective depression portions 84a to overlap with the respective groove portions 81b of the pressure receiving pin 8 as viewed from the side opposite to the exhaust passage 4 in the axial direction of the pressure receiving pin 8. Even when the positions of the respective depression portions 84a are displaced from the respective groove portions 81b in the circumferential direction of the pressure receiving pin 8, the small diameter portion 85 is disposed between the fitting portion 81 and the collar portion 84. Accordingly, air that flows into the gap formed between the outer peripheral surface of the small diameter portion 85 and the inner peripheral surface of the through hole 2a through the respective depression portions 84a spreads in the gap and, thereafter, flows into the gap formed between the outer peripheral surface of the intermediate portion 83 and the inner peripheral surface of the through hole 2a through the respective groove portions 81b. Therefore, a foreign substance that intrudes into the space formed between the outer peripheral surface of the pressure receiving pin and the inner peripheral surface of the hole portion can be removed without any problem.

The above-described embodiment is merely for example, and the scope of the present disclosure should not be considered limiting. The scope of the present disclosure is defined by claims, and all modifications and changes belonging to the equivalent range of the claims fall within a range of the present disclosure.

INDUSTRIAL APPLICABILITY

The technique disclosed herein is effective for a mold degassing apparatus used for discharging gas from a cavity of a mold for casting a cast product.

REFERENCE CHARACTER LIST 1 mold degassing apparatus
2 fixed mold
3 movable mold
4 exhaust passage
6 air supply device
8 pressure receiving pin
12 closing valve
12b sliding portion
15 interlocking lever
31 mold
36 cavity
81 fitting portion
81a sliding portion
81b groove portion
82 distal end portion
83 intermediate portion
84 collar portion
84a depression portion
85 small diameter portion

The invention claimed is:

1. A mold degassing apparatus comprising:
a fixed mold;
a movable mold;
an exhaust passage formed on a mating surface between the fixed mold and the movable mold and communicating with a cavity of a mold;
a pressure receiving pin provided on an inlet side of the exhaust passage in the fixed mold in such a way as to be slidable toward the exhaust passage and toward a side opposite to the exhaust passage, and configured to slide toward the side opposite to the exhaust passage due to a flow pressure of molten metal that flows into the exhaust passage;
a closing valve provided on an outlet side of the exhaust passage in the fixed mold, and configured to close the exhaust passage via an interlocking lever due to sliding of the pressure receiving pin toward the side opposite to the exhaust passage; and
an air supply device that supplies air at a time of opening the movable mold,
wherein the pressure receiving pin includes:
a fitting portion that fits in a hole portion provided in the fixed mold and communicating with a portion of the exhaust passage on the inlet side,
a distal end portion that is located coaxially with the fitting portion at a position closer to the exhaust passage than the fitting portion, that slides with respect to the hole portion upon reception of the molten metal, and that has a columnar shape, and
an intermediate portion that is located coaxially with the fitting portion and the distal end portion at a position between the fitting portion and the distal end portion and that has a diameter smaller than a diameter of the distal end portion, and
wherein the air supply device is provided such that the supplied air passes through a gap formed between an outer peripheral surface of the intermediate portion and an inner peripheral surface of the hole portion and a gap formed between the distal end portion and the fixed mold and flows out to the movable mold.

2. The mold degassing apparatus according to claim 1,
wherein the fitting portion includes:
a sliding portion that slides with respect to the inner peripheral surface of the hole portion with a predetermined clearance, and
a groove portion that extends in an axial direction of the pressure receiving pin and that forms a gap between the groove portion and the inner peripheral surface of the hole portion, the gap being larger than the predetermined clearance, and
wherein the air supply device is configured to supply air into the gap formed between the outer peripheral surface of the intermediate portion and the inner peripheral surface of the hole portion through the groove portion at the time of opening the movable mold.

3. The mold degassing apparatus according to claim 2, wherein the air supply device is configured to supply air from the side opposite to the exhaust passage with respect to the fitting portion.

4. The mold degassing apparatus according to claim 3,
wherein the pressure receiving pin further includes:
a collar portion that is located on the side opposite to the exhaust passage with respect to the fitting portion, and that has a diameter larger than a largest diameter of the fitting portion, and
a small diameter portion that is provided between the fitting portion and the collar portion, and that has a radius set to be equal to or less than a shortest distance from a center axis of the pressure receiving pin to the groove portion of the fitting portion, and
wherein the collar portion includes a depression portion that communicates with a gap formed between an outer peripheral surface of the small diameter portion and the inner peripheral surface of the hole portion as viewed from the side opposite to the exhaust passage in the axial direction.

5. The mold degassing apparatus according to claim 4,
wherein the groove portion is one of a plurality of groove portions formed at intervals in a circumferential direction of the fitting portion, and
wherein the depression portion is one of a plurality of depression portions disposed at positions that overlap with the plurality of the groove portions as viewed from the side opposite to the exhaust passage in the axial direction.

6. The mold degassing apparatus according to claim 5, wherein the plurality of groove portions are formed at equal intervals in the circumferential direction of the fitting portion.

7. The mold degassing apparatus according to claim 1,
wherein the fitting portion includes a plurality of groove portions that each extend in an axial direction of the pressure receiving pin and form a gap between each groove portion and the inner peripheral surface of the hole portion, and
wherein the plurality of groove portions are formed at equal intervals in a circumferential direction of the fitting portion.

8. The mold degassing apparatus according to claim 1, wherein an outer diameter of the distal end portion is equal to a largest diameter of the fitting portion.

9. The mold degassing apparatus according to claim 2, wherein the groove portion is one of a plurality of groove portions formed at equal intervals in a circumferential direction of the fitting portion.

10. The mold degassing apparatus according to claim 3, wherein the groove portion is one of a plurality of groove portions formed at equal intervals in a circumferential direction of the fitting portion.

11. The mold degassing apparatus according to claim 4, wherein the groove portion is one of a plurality of groove portions formed at equal intervals in a circumferential direction of the fitting portion.

* * * * *